UNITED STATES PATENT OFFICE.

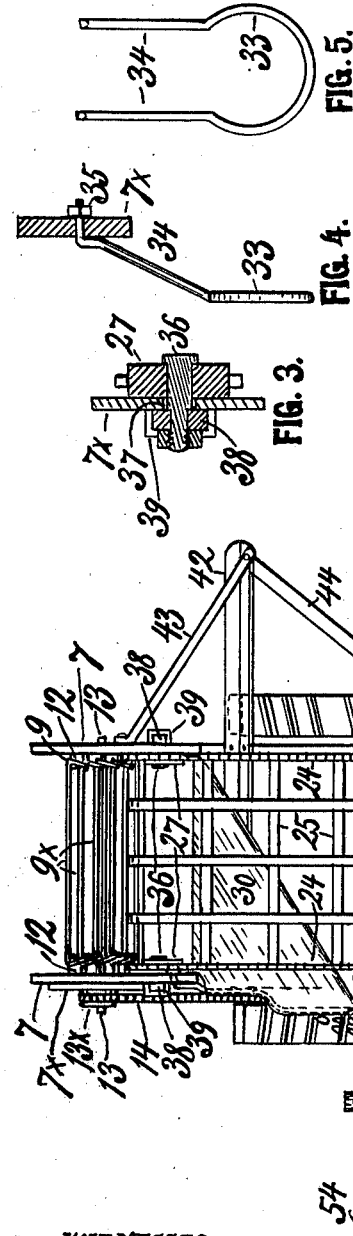
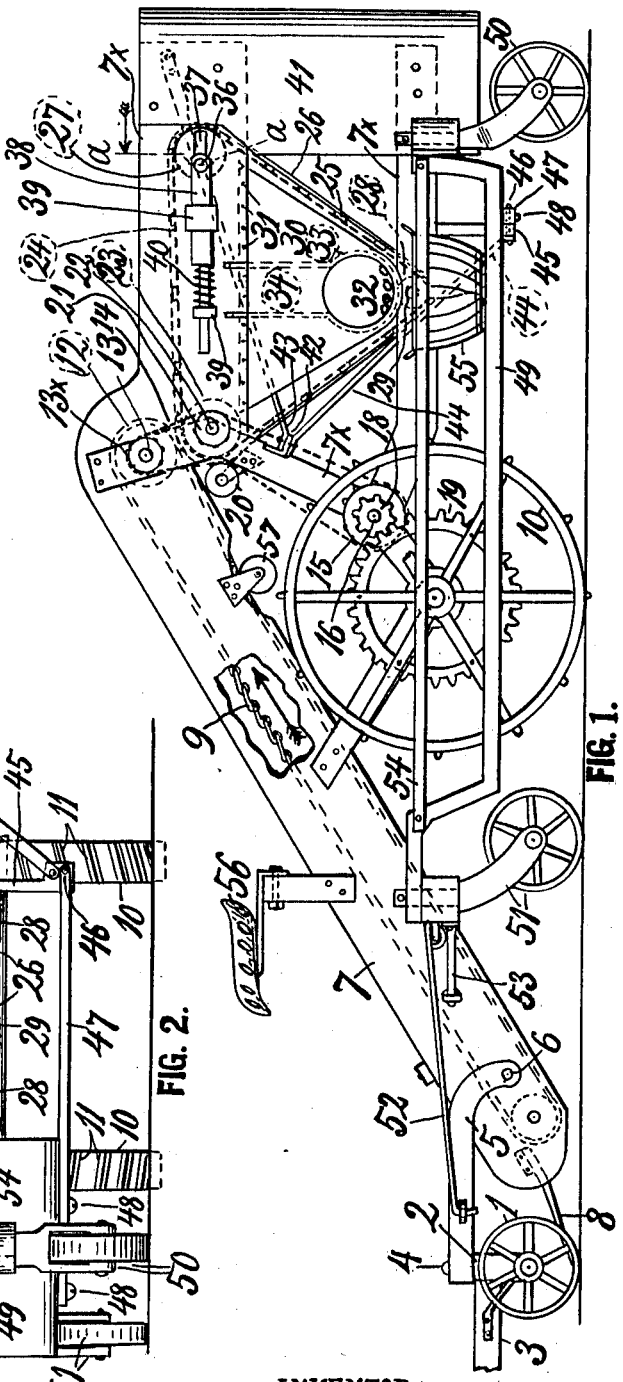

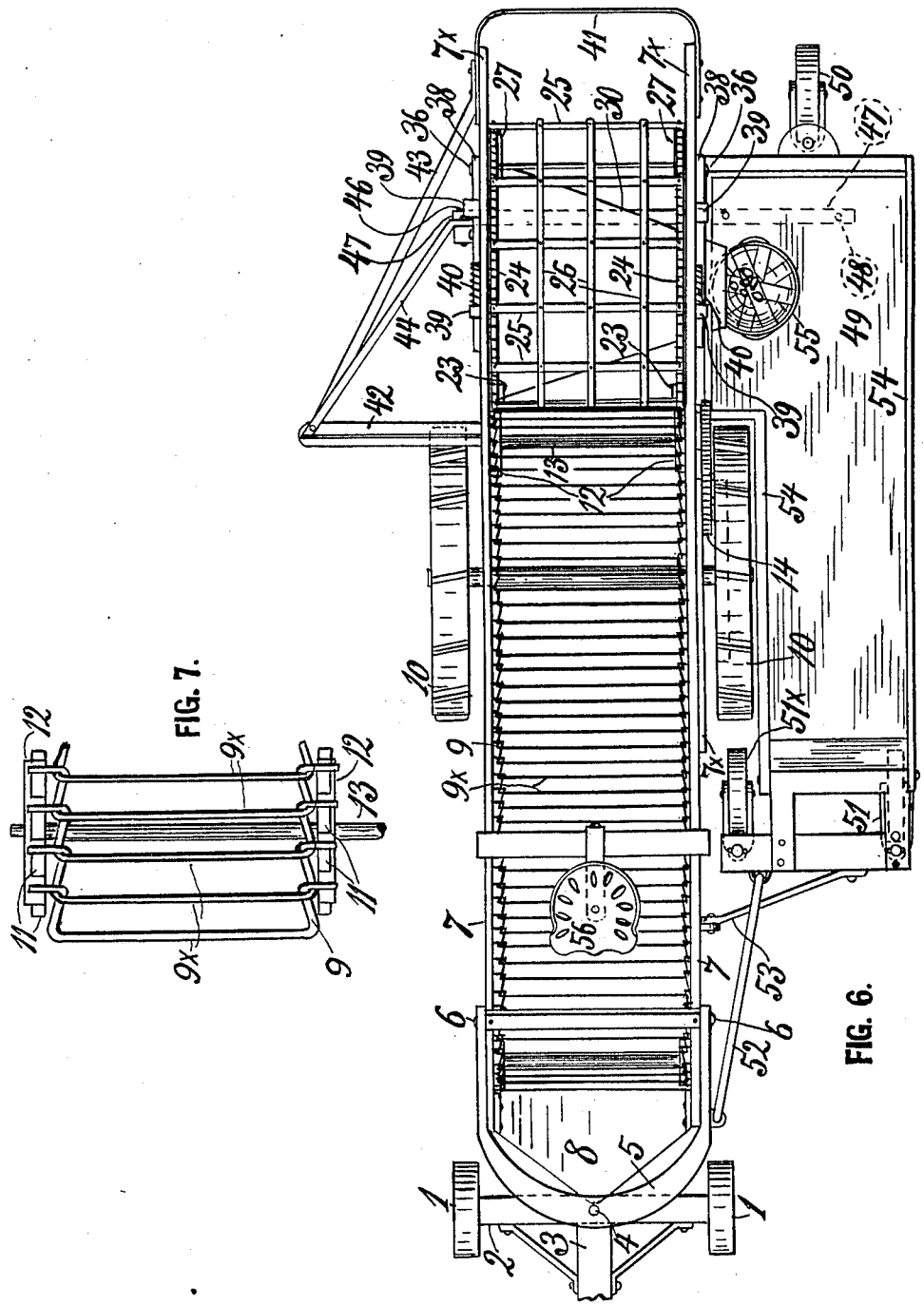

GEORGE W. BRUCE, OF LARIMORE, NORTH DAKOTA.

POTATO-HARVESTER.

1,019,753.   Specification of Letters Patent.   Patented Mar. 12, 1912.

Application filed November 25, 1910. Serial No. 594,083.

*To all whom it may concern:*

Be it known that I, GEORGE W. BRUCE, a citizen of the United States, residing at Larimore, in the county of Grand Forks and State of North Dakota, have invented a new and useful Potato-Harvester, of which the following is a specification.

My invention relates to potato harvesters; and the object is to provide a potato harvester with flexible and yielding means for guiding the potatoes out of the machine without injuring their surface.

In the accompanying drawings, Figure 1 is a side elevation of my improved potato harvester. Fig. 2 is a rear end elevation of the machine shown in Fig. 1 with the wind guard removed. Fig. 3 is an enlarged sectional view on the line $a$—$a$ Fig. 1. Fig. 4 is a detail rear elevation of the spring 33, 34 in Fig. 1 with its supporting board in section. Fig. 5 is a left side elevation of the spring shown in Fig. 4. Fig. 6 is a top or plan view of the machine shown in Fig. 1. Fig. 7 is an enlarged portion of the carrier 9 in Fig. 6 and other views, and the sprocket wheels and shaft operating the same.

Referring to the drawings by reference numerals, 1, 1 designate the steering wheels having their axle 2 provided with a draft pole 3 and swinging horizontally on a kingbolt 4 in a large draft clevis 5; the latter having its rear ends attached at 6 to the front end of the inclined main frame 7 of the machine. The latter may be of any of the types drawn by horses or other power, and having at the front end a shovel 8, and rearward thereof an endless carrier 9 operatively connected with one or both of the supporting wheels 10, which are therefore provided with cleats at the periphery, as shown. Said endless carrier may be of any suitable construction, but I prefer the type best shown in Fig. 7, where it will be seen that the ends of spaced bars $9^\times$ are crank-shaped and engaged with each other so that the bars form a broad chain or carrier, which is engaged by the teeth 11 of sprockets 12, which are secured on and rotated by a shaft 13 and a sprocket $13^\times$ secured thereon, (see Figs. 1 and 2). The last mentioned sprocket is rotated by a link-belt 14, which is driven by a sprocket 15, that is mounted on a stud 16, secured in the rear frame work $7^\times$; said sprocket 15 having at one side secured a pinion 18, driven by a gear wheel 19, that is secured on one of the large ground wheels 10.

The front run of the link-belt 14 is guided and stretched by a roller 20, and the rear run engages a sprocket 21, that is fixed on a shaft 22. On said shaft are also fixed two sprockets 23, which operate an endless vine-carrier, that is formed of two endless link-belts 24, transverse bars 25 secured thereto, and, extending between said link-belts parallel to them, several narrow endless leather belts 26 secured to the cleats or transverse bars. The object of the leather belts is to prevent vines from dropping down with the potatoes between the bars of the carrier. Said vine-carrier extends over rear sprockets 27 and a pair of guiding rollers or wheels 28, which may be mounted on studs or on a shaft 29 (see Fig. 2) in the lower part of the rear frame work. Within the triangle thus formed by the vine-carrier is mounted a flexible hopper 30, which is made of canvas and secured at its upper edges to the frame work, as indicated at 31 in Fig. 1; the lower end of the hopper is projected laterally out of the machine and is formed with a discharge opening 32, in the edges of which is inlaid the ring-shaped portion 33 of a U-shaped spring 33—34, having its arms 34 (see Figs. 4 and 5) secured by nuts 35, or other means, in the rear frame $7^\times$, so that when the potatoes drop into the hopper the yielding of said spring and the softness of the canvas of which the hopper is made, prevent injury to the dropping potatoes. The spring also serves to hold the hopper in normal shape, stretched downward and outward, as shown.

In order to fully separate the potatoes from the vines while they pass over the hopper, a vibrating movement is given to the vine carrier. This is done by mounting the sprockets 27 eccentrically on a shaft, or preferably on two studs 36 (see Figs. 1 and 3); each stud projecting outward through a slot 37 in the frame work $7^\times$ and secured in a bar 38, which slides in keepers 39 on the frame and is at all times pressed rearwardly by a spring 40; so that in operation the eccentric sprockets vibrate the upper run of the carrier without slackening the latter, as the springs 40 keep the sprockets at all times in full contact with the link-belts of the carrier.

41 is a wind guard or guide for the vines to drop through to the ground without being blown into places where they will be in the way for the next operation, or out of line for ready collection by rakes or other machines used for that purpose.

To stiffen the rear portion of the frame work I project one of the transverse bars of the frame out beyond one side of the frame, to form an arm 42, and extend rearwardly therefrom to the upper portion of the rear frame a brace 43, and downwardly and rearwardly from the arm a brace 44. The latter brace has its rear end preferably secured to a bracket 45. To the latter is pivoted at 46 one end of a bar 47, which extends transversely under the machine and has its other end rigidly secured at 48 to a truck 49, which is mounted on a rear caster 50 and two front casters 51 and 51$^x$. The front end of the truck is secured to the clevis 5 by a draw-bar 52, and to the frame 7 by a lateral link 53; the latter being pivotally connected at both ends, to permit the casters to follow the ground properly; and the rear pivot joint 46 permits the rear caster to rise and fall in passing over uneven ground; at the same time the bar 47 prevents the truck from rocking or falling over sidewise on the single rear caster, or on all the casters. The truck is however limber enough to be sufficiently twisted by its load to cause the two front casters to follow the ground. Said truck is a permanent attachment or part of the harvester, and consists mainly of a flat frame or platform provided with rails 54 for the guarding of bushel baskets carried on the truck, as will presently be more fully described.

Upon the front part of the machine is mounted the usual seat 56 for the person to sit in who drives the team drawing the machine.

In Fig. 1 57 is a supporting roller for the lower run of the main carrier 9.

In the operation of the machine, 20 to 30 bushel-baskets are placed on the truck in telescoped order so as to take up as little room as possible. As the machine is drawn forward with the shovel 8 lowered into the ground, dirt, potatoes and vines are scooped up and brought upon the carrier 9, which conveys the potatoes and vines to the rear carrier 24—25 while the dirt drops down through the carrier 9. The rear carrier permits the potatoes to drop through its upper run into the hopper 30, but carries the vines rearward thereof and drops them to the ground through the wind guard 41. During such operation a person riding on the truck places one basket at a time in the position indicated by the basket 55, below the discharge opening of the hopper, and as each basket is filled it is removed and an empty one replaced; the filled baskets are piled in rows and on top of each other on the truck, and when all the baskets are full, the machine is thrown out of digging contact with the ground and its endless carriers are stopped, all by levers and couplings, which being of well known construction are not shown in my drawings. The machine is then driven to the edge of the potato field, and the full baskets are there exchanged for empty ones left by the teams that haul away the potatoes to the storing place.

What I claim is:

In a potato harvester, the combination with a mechanism adapted to separate the potatoes from the vines, of a hopper below said separating mechanism, said hopper being of flexible material to prevent injury to the potatoes dropped into it; and a yoke-shaped spring secured on the frame of the machine and engaging the discharge end of the hopper to hold the latter yieldingly in normal shape.

In testimony whereof I affix my signature, in presence of two witnesses.

GEORGE W. BRUCE.

Witnesses:
 A. P. LORD,
 G. W. SWINGER.

---

Copies of this patent may be obtained for five cents each, by addressing the "Commissioner of Patents, Washington, D. C."